(12) United States Patent
Perry et al.

(10) Patent No.: US 6,322,400 B1
(45) Date of Patent: Nov. 27, 2001

(54) BATTERY TERMINATION PANEL

(75) Inventors: Jay Perry, Colleyville; Joseph Williams, Flower Mound, both of TX (US)

(73) Assignee: Marconi Communications, Inc., Cleveland, OH (US)

(*) Notice: Subject to any disclaimer, the term of this patent is extended or adjusted under 35 U.S.C. 154(b) by 0 days.

(21) Appl. No.: 09/277,705

(22) Filed: Mar. 26, 1999

(51) Int. Cl.[7] .............................. H01R 11/09; H01R 4/60
(52) U.S. Cl. ........................ 439/723; 439/724; 439/212
(58) Field of Search ........................... 439/135, 441, 439/108, 404, 801, 212, 723, 724, 431; 361/835, 637, 823, 824, 825, 826, 827

(56) References Cited

U.S. PATENT DOCUMENTS

| | | | |
|---|---|---|---|
| 3,002,173 | * 9/1961 | Allen | 439/431 |
| 4,057,312 | * 11/1977 | Hagermo | 439/431 |
| 4,653,842 | * 3/1987 | Kirma | 439/712 |
| 4,800,465 | 1/1989 | Rodgers et al. . | |
| 4,835,659 | 5/1989 | Goodson . | |
| 5,000,699 | * 3/1991 | Nadin | 439/511 |
| 5,001,602 | 3/1991 | Suffi et al. . | |
| 5,044,979 | 9/1991 | Siemon et al. . | |
| 5,075,938 | * 12/1991 | Hutchinson | 24/464 |
| 5,140,744 | 8/1992 | Miller . | |
| 5,160,273 | 11/1992 | Carney . | |
| 5,197,903 | * 3/1993 | Casey et al. | 439/709 |
| 5,356,309 | 10/1994 | Carney et al. . | |
| 5,806,948 | 9/1998 | Rowan et al. . | |
| 5,832,073 | 11/1998 | Hannigan et al. . | |
| 5,975,940 | * 11/1999 | Hartmann et al. | 439/441 |
| 6,001,506 | * 12/1999 | Timmons et al. | 429/178 |

OTHER PUBLICATIONS

Drawing entitled, "Isolated, Dual Polarity Termination Panel", dated Jun. 8. 1994 which is a drawing of prior art described in the background of the invention.

* cited by examiner

Primary Examiner—Tulsidas Patel
Assistant Examiner—Chandrika Prasad
(74) Attorney, Agent, or Firm—Jones, Day, Reavis & Pogue

(57) ABSTRACT

A one-piece plastic part is configured to support a bus bar in an electrical equipment cabinet. The plastic part includes an elongated front wall and an elongated box frame structure projecting transversely from a rear side of the front wall. The front wall and the box frame structure together define peripheral boundaries of an elongated chamber configured to contain the bus bar. The front wall defines a front side of the chamber, and is configured to block electrically conductive access to the bus bar through the front side of the chamber. The box frame structure defines an open rear side of the chamber, and is configured to provide access for insertion of an electrical terminal through the open rear side for connection of the terminal to the bus bar in the chamber. A first aperture in the terminal is configured to receive a fastener which fastens the terminal to the bus bar. A mounting boss on the bus bar fits within a second aperture in the terminal so as to block movement of the terminal relative to the bus par pivotally about the fastener.

11 Claims, 3 Drawing Sheets

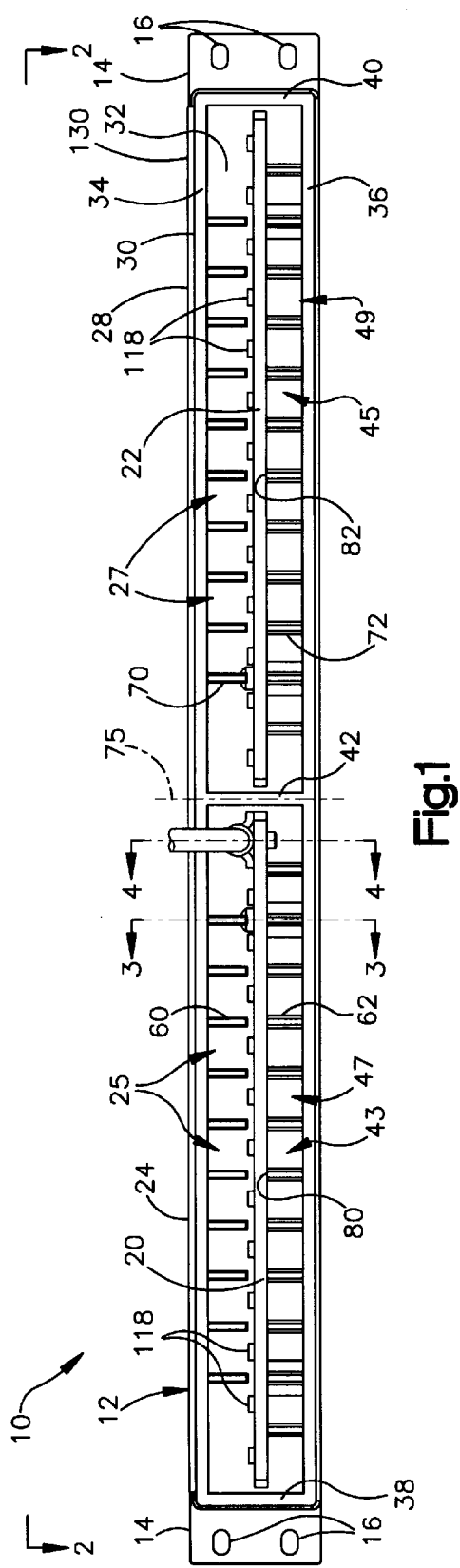

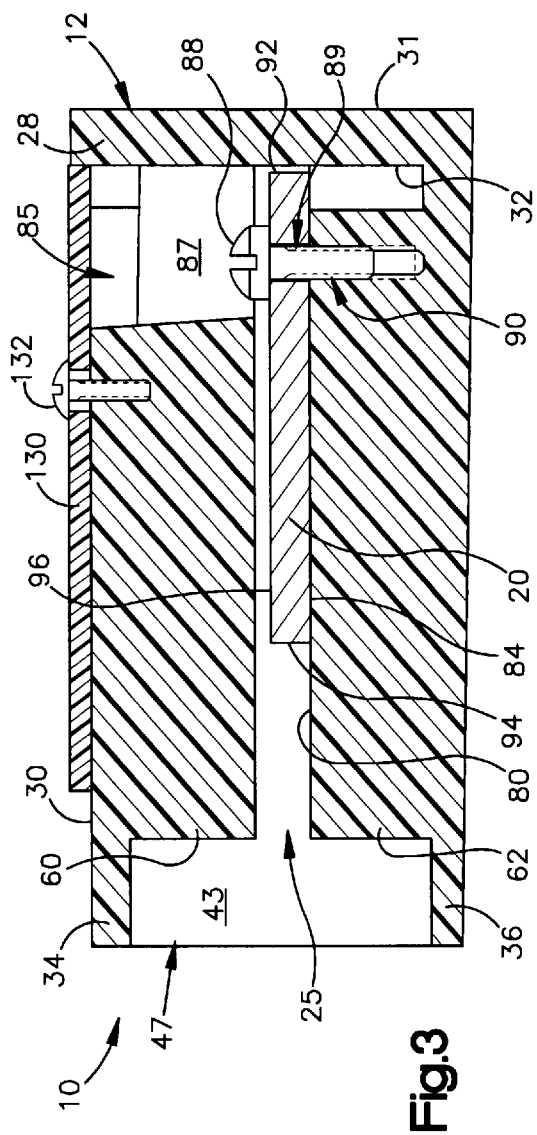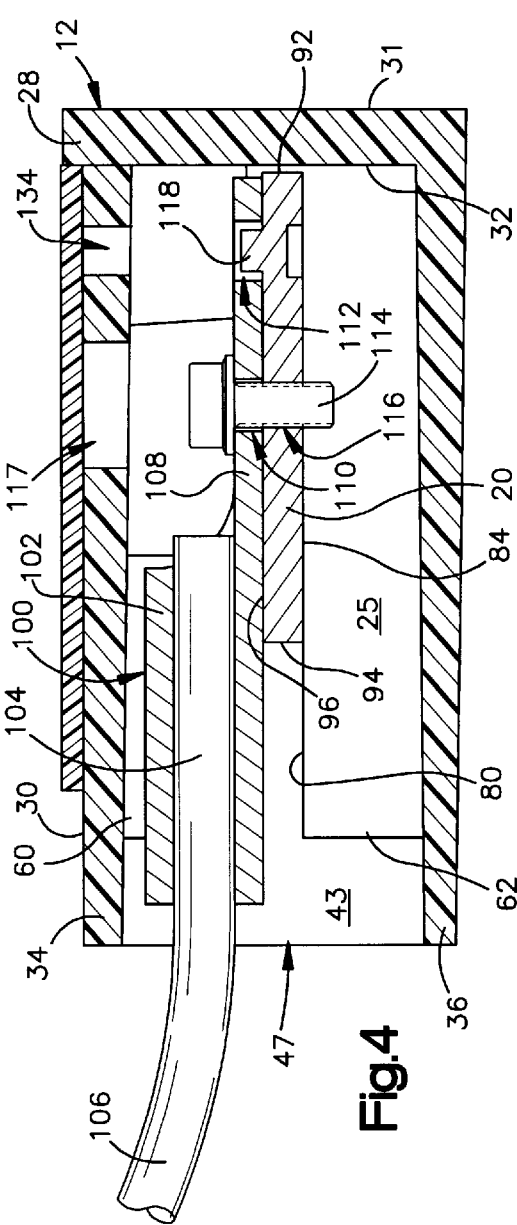

BATTERY TERMINATION PANEL

FIELD OF THE INVENTION

The present invention relates to a termination panel at which electrical connections are made to a bus bar, and particularly relates to a battery termination panel for use in a telecommunications equipment cabinet.

BACKGROUND OF THE INVENTION

A telecommunications equipment cabinet may contain backup batteries for use upon failure of an external power source. Such a cabinet also contains a rectifier which ordinarily receives AC current from the external power source, and a bus bar through which the telecommunications equipment is interconnected with the batteries and the rectifier. The bus bar and a support structure for the bus bar are assembled together as a unit separate from the cabinet and the other contents of the cabinet. Such a unit is referred to as a battery termination panel.

A known battery termination panel extends horizontally between a pair of mounting brackets in the cabinet. The support structure includes a rectangular front wall with mounting tabs at its opposite ends. The mounting tabs on the front wall are fastened to the mounting brackets in the cabinet. Braces project from the rear side of the front wall. A pair of bus bars are fastened to the braces in a horizontally extending, end-to-end orientation behind the front wall. The braces are formed of fiberglass so as to insulate the bus bars from the front wall, which is formed of metal.

In the foregoing type of battery termination panel, the bus bars have rear side surfaces that face horizontally away from the front wall. A terminal at the end of a wire or cable can be connected to either of the bus bars by a pair of fasteners. The fasteners extend through a pair of apertures in the terminal, and further through an aligned pair of apertures in the bus bar. Two fasteners are used so that each fastener can block movement of the terminal pivotally about the other fastener. This helps to prevent inadvertent loosening of the fastened connection.

SUMMARY OF THE INVENTION

In accordance with a principal feature of the present invention, an apparatus comprises a one-piece plastic part configured to support a bus bar in an electrical equipment cabinet. The plastic part includes an elongated front wall and an elongated box frame structure projecting transversely from a rear side of the front wall. The front wall and the box frame structure together define peripheral boundaries of an elongated chamber configured to contain the bus bar. The front wall defines a front side of the chamber, and is configured to block electrically conductive access to the bus bar through the front side of the chamber. The box frame structure defines an open rear side of the chamber, and is configured to provide access for insertion of an electrical terminal through the open rear side for connection of the terminal to the bus bar in the chamber.

In accordance with another principal feature of the invention, an apparatus includes a bus bar and an electrical terminal which is connectable to the bus bar. The terminal has a first aperture configured to receive a fastener for fastening the terminal to the bus bar. A mounting boss is located on one of those parts, and is configured to fit within a second aperture in the other part. When the mounting boss is received in the second aperture, it blocks movement of the terminal relative to the bus bar pivotally about the fastener.

DESCRIPTION OF THE DRAWINGS

The present invention will be apparent to those skilled in the art in view of the accompanying drawings, wherein:

FIG. 1 is a rear view of an apparatus comprising a first embodiment of the invention;

FIG. 2 is a view taken on line 2—2 of FIG. 1;

FIG. 3 is a view taken on line 3—3 of FIG. 1;

FIG. 4 is a view taken on line 4—4 of FIG. 1;

DESCRIPTION OF PREFERRED EMBODIMENTS

Figure 5:
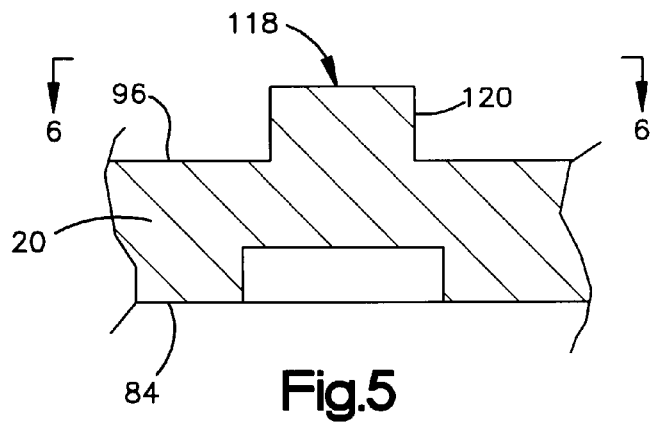
FIG. 5 is an enlarged partial view of a part shown in FIG. 4.

An apparatus 10 comprising a first embodiment of the present invention is shown in FIG. 1. The apparatus 10 includes a termination panel 12 for a bank of backup batteries (not shown) in a telecommunications equipment cabinet. As shown from the rear in FIG. 1, the termination panel 12 is a horizontally elongated structure with a pair of mounting tabs 14 at its opposite ends. The mounting tabs 14 have apertures 16 for receiving fasteners that fasten the termination panel 12 to a corresponding pair of vertical mounting brackets in the cabinet. In accordance with the present invention, the termination panel 12 includes a pair of bus bars 20 and 22 and a support structure in the form of a housing 24 which contains the bus bars 20 and 22. A first row of electrical connection compartments 25 extends along the first bus bar 20. A second row of electrical connection compartments 27 extends along the second bus bar 22. The connection compartments 25 and 27 are open at the rear of the housing 24. This provides access for insertion of electrical terminals that interconnect the bus bars 20 and 22 with a power source, the backup batteries, and the telecommunications equipment contained in the cabinet.

The housing 24 includes a front wall 28 and a box frame structure 30. The front wall 28 has a flat, elongated rectangular configuration and includes the mounting tabs 14. When the termination panel 12 is mounted in the cabinet, a front side surface 31 of the front wall 28 faces outward of an access door in the cabinet. The box frame structure 30, which also has an elongated rectangular configuration, projects transversely from a rear side surface 32 of the front wall 28. Upper and lower side walls 34 and 36 of the box frame structure 30 extend horizontally between a pair of vertical end walls 38 and 40. An inner wall 42 of the box frame structure 30 extends vertically between the upper and lower side walls 34 and 36 at a location mid-way between the end walls 38 and 40. These walls 34-42 of the box frame structure 30 define the length and height of a pair of rectangular chambers 43 and 45 containing the bus bars 20 and 22, respectively. The chambers 43 and 45 have open rear sides 47 and 49 for access to the bus bars 20 and 22, but are closed at their front sides by the front wall 28. The front wall 28 thus blocks electrically conductive access to the bus bars 20 and 22 at the front side of the termination panel 12, and is most preferably imperforate (except for the fastener apertures 16) fully throughout the length and width of the front side surface 31.

The connection compartments 25 in the first chamber 43 are separated by upper and lower divider walls 60 and 62. The divider walls 60 and 62 are portions of the housing 24. The connection compartments 27 in the second chamber 45 also are separated by upper and lower divider walls 70 and 72 that are portions of the housing 24. The number, size and arrangement of the compartments 25 in the first chamber 43 are the same as the number, size and arrangement of the compartments 27 in the second chamber 45. Accordingly, the housing 24 in the first embodiment of the invention is symmetrical about a transverse centerline 75 at the inner wall 42, as shown in FIG. 1.

In accordance with a particular feature of the present invention, the housing 24 in the first embodiment is a one-piece plastic part which is made from a single homogenous material. By "one-piece" it is meant that the housing 24 is a single unit exclusive of separate but joined elements. The plastic material may include additives such as stabilizers, fillers, reinforcements, and the like. In the preferred embodiment, the plastic material has a foam structure.

As shown in FIGS. 1 and 3, the lower divider walls 62 and 72 have coplanar upper edge surfaces 80 and 82. The first bus bar 20, which has a rectangular cross-sectional configuration, is received transversely through the open rear side 47 of the first chamber 43. The first bus bar 20 is then placed in an installed position in which a lower side surface 84 of the bus bar 20 rests on the upper edge surfaces 80 of the lower divider walls 62. Four keyhole apertures 85 in the upper side wall 34 of the box frame structure 30 are aligned with gaps 87 between the front wall 28 and four of the upper divider walls 60. The keyhole apertures 85 and the aligned gaps 87 provide access for installation of fasteners 88 through corresponding apertures 89 in the bus bar 20, and further into aligned bores 90 in the adjacent lower divider walls 62, as shown by way of example in FIG. 3. The first bus bar 20 is thus installed in the first chamber 43 in an orientation in which the width of the bus bar 20 and the width of the front wall 28 extend in directions perpendicular to each other. More specifically, a front edge surface 92 of the bus bar 20 faces the front wall 28, a rear edge surface 94 of the bus bar 20 faces the open rear side 47 of the chamber 43, and the upper and lower side surfaces 96 and 84 of the bus bar 20 face the upper and lower side walls 34 and 36 of the box-frame structure 30. The second bus bar 22 is preferably the same as the first bus bar 20 so it can be installed in the second chamber 45 in the same manner.

FIG. 4 shows an example of the manner in which a known electrical terminal 100 can be connected to either of the two bus bars 20 and 22 in accordance with the present invention. The terminal 100 is an elongated lug with a tubular portion 102 crimped against an end portion 104 of a copper wire 106. A flat portion 108 of the lug 100 projects longitudinally from the tubular portion 102. The flat portion 108 of the lug 100 has a pair of circular apertures 110 and 112 which are spaced apart along its length.

The lug 100 is received in a connection compartment 25 in a horizontal orientation in which the flat portion 108 of the lug 100 overlies and rests upon the upper side surface 96 of the bus bar 20. A fastener 114 is installed through the first aperture 110 in the lug 100, and further through an aligned aperture 116 in the bus bar 20. An access opening 117 for the fastener 114 extends through the upper side wall 34 of the box-frame structure 30 directly above the aligned apertures 110 and 116. In accordance with the invention, each bus bar 20 and 22 has a plurality of mounting bosses 118 projecting from the upper side surface 96. Each mounting boss 118 is located transversely adjacent to an aperture like the aperture 110 shown in FIG. 4. The second aperture 112 in the lug 100 is received over an adjacent mounting boss 118 on the bus bar 20. In this arrangement the mounting boss 118 blocks movement of the lug 100 relative to the bus bar 20 pivotally about the fastener 114. This enables the lug 100 to be fastened immovably to the bus bar 20 without the use of a second fastener.

Figure 6:
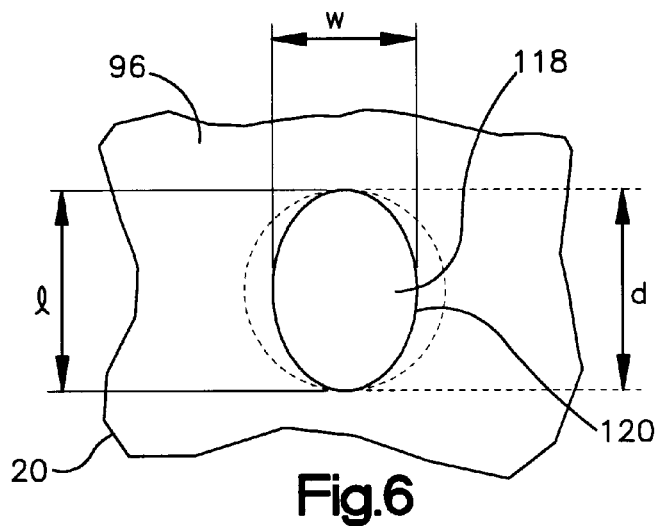
FIG. 6 is a view taken on line 6—6 of FIG. 5.

The mounting bosses 118 on the bus bars 20 and 22 are preferably alike, with each mounting boss 118 having the configuration shown in FIGS. 5 and 6. Each mounting boss 118 is thus defined by a portion of the corresponding bus bar 20 or 22, and projects from the upper side surface 96. A peripheral side wall 120 of the mounting boss 118 is perpendicular to the upper side surface 96, as viewed in FIG. 5, and provides the mounting boss 118 with a noncircular peripheral configuration, as viewed in FIG. 6. Specifically, the mounting boss 118 has an elongated, preferably elliptical peripheral configuration with a length (l) that is just slightly less than the diameter (d) of the second aperture 112 (FIG. 4) in the lug 100. The width (w) of the mounting boss 118 is substantially less than the diameter (d). The width (w) provides a dimensional tolerance between the mounting boss 118 and the flat portion 108 of the lug 100 in a direction extending along the length of the flat portion 108. The length (l) maintains a close fit in the direction in which the flat portion 108 of the lug 100 might otherwise be movable relative to the mounting boss 118 pivotally about the fastener 114 (FIG. 4). This configuration is imparted to the mounting boss 118 by forcing the metal material of the bus bar 20 into an elliptically configured die upon impact of a punch against the lower side surface 84 of the bus bar 20. The punch also could be elliptical in accordance with the invention.

Viewing holes 130 extend through the upper side wall 34 of the box frame structure 30 directly above the mounting bosses 118 on the bus bars 20 and 22, as best shown in FIG. 4. As best shown in FIG. 2, the first embodiment of the invention further includes a clear plastic cover panel 132 which is fastened to the housing 24 by a pair of fasteners 134. The cover panel 130 rests on the upper wall 34 of the box frame structure 30 to cover the viewing holes 130 and the other apertures 85 and 117 above the first bus bar 20 in the first chamber 43. This cover panel 130, or another like it, could be mounted on the other half of the upper wall 34 for protection of the second bus bar 22 in the second chamber 45, as needed. The fasteners 134, as well as the fasteners 88 and 114 described above, preferably are thread forming screws.

Figure 7:
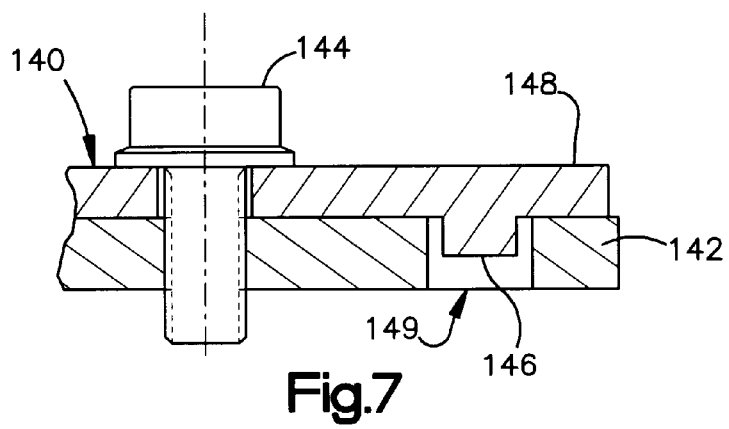
FIG. 7 is a partial view of an apparatus comprising a second embodiment of the invention.

A second embodiment of the invention is shown partially in FIG. 7. In the second embodiment, an electrical terminal 140 is fastened to a bus bar 142 by the use of a fastener 144 and a mounting boss 146. However, the mounting boss 146 in the second embodiment projects from a flat portion 148 of the terminal 140 into a corresponding aperture 149 in the bus bar 142. The mounting boss 146 has a circular peripheral configuration. The aperture 149 is elongated to provide dimensional tolerance lengthwise of the flat portion 148 of the terminal 140, and is narrower in an orthogonal direction so as to block movement of the terminal 140 relative to the bus bar 142 pivotally about the fastener 144.

The invention has been described with reference to preferred embodiments. Those skilled in the art will perceive improvements, changes and modifications. Such improvements, changes and modifications are intended to be covered by the appended claims.

We claim:

1. Apparatus comprising;
   a support structure configured to support a bus bar in an electrical equipment cabinet;
   said support structure including an elongated front wall and an elongated box frame structure projecting transversely from a rear side of said front wall, with said front wall and said box frame structure together defining peripheral boundaries of an elongated chamber configured to contain the bus bar;

said front wall defining a front side of said chamber and being configured to block electrically conductive access to the bus bar through said front side of said chamber;

said box frame structure defining an open rear side of said chamber and being configured to provide access for insertion of an electrical terminal through said open rear side for connection of the terminal to the bus bar in said chamber;

said box frame structure having a pair of opposed side walls defining opposed sides of said chamber, with at least one of said side walls having a plurality of apertures which are sized to receive fasteners for fastening the bus bar to said support structure;

said support structure further including a plurality of divider walls which are spaced apart along the length of said chamber to define a corresponding plurality of connection compartments within said chamber, with each of said connection compartments being sized to receive an electrical terminal inserted through said open rear side of said chamber for connection of the electrical terminal to the bus bar in said chamber;

a plurality of said divider walls being spaced from said front wall to define gaps through which the fasteners can be moved across said rear side of said front wall from said apertures to the bus bar.

2. Apparatus as defined in claim 1 wherein another plurality of said divider walls have coplanar support surfaces against which the bus bar is receivable in abutment upon being fastened to said plastic part by the fasteners, and further have apertures for receiving the fasteners.

3. Apparatus as defined in claim 1 wherein said front wall has opposite end portions configured to be fastened to a corresponding pair of mounting structures in the equipment cabinet.

4. Apparatus as defined in claim 1 wherein said support structure is a one-piece plastic part.

5. Apparatus comprising;

a termination panel including a bus bar and a support structure configured to support said bus bar in an electrical equipment cabinet;

said support structure including an elongated front wall defining the front of said termination panel, and further including an elongated box frame structure projecting transversely from a rear side of said front wall, said front wall and said box frame structure together defining peripheral boundaries of an elongated chamber containing said bus bar;

said front wall defining a front side of said chamber and being configured to block electrically conductive access to said bus bar through said front side of said chamber;

said box frame structure defining an open rear side of said chamber and being configured to provide access for insertion of an electrical terminal through said open rear side of said chamber for connection of the terminal to said bus bar in said chamber;

said box frame structure having a pair of opposed side walls defining top and bottom sides of said chamber, with said bus bar being spaced from said side walls;

at least one of said side walls having a plurality of apertures which are sized to receive fasteners that fasten said bus bar to said support structure;

said support structure further including a plurality of divider walls which are spaced apart along the length of said chamber to define a corresponding plurality of connection compartments within said chamber, with each of said connection compartments being sized to receive an electrical terminal inserted through said open rear side of said chamber for connection of the electrical terminal to said bus bar in said chamber;

a plurality of said divider walls being spaced from said front wall to define gaps through which said fasteners are movable across said rear side of said front wall from said apertures to said bus bar.

6. Apparatus as defined in claim 5 wherein another plurality of said divider walls have a row of coplanar support surfaces, and further have a plurality of apertures for receiving said fasteners, and said bus bar has a surface retained in abutment with said support surfaces under a retaining force applied by said fasteners.

7. Apparatus as defined in claim 5 wherein said box frame structure is a portion of a one-piece plastic part.

8. Apparatus as defined in claim 7 wherein said front wall of said support structure also is a portion of said one-piece plastic part.

9. Apparatus as defined in claim 5 wherein said box frame structure is configured to provide access for insertion of said bus bar into said chamber transversely through said open rear side of said chamber for installation of said bus bar in said chamber.

10. Apparatus as defined in claim 5 wherein said front wall and said bus bar are elongated rectangular structures with respective lengths extending in directions parallel to each other and respective widths extending in directions perpendicular to each other.

11. Apparatus as defined in claim 10 wherein said chamber has a front side defined by said front wall, and has top and bottom sides defined by said box frame structure, and wherein said bus bar has a rectangular cross-sectional configuration with a front edge surface facing said front side of said chamber, a rear edge surface facing said open rear side of chamber, and top and bottom side surfaces respectively facing said top and bottom sides of said chamber.

* * * * *